April 6, 1971 B. L. SHARON 3,573,949

PLATING STOPOFF PROCESS

Filed April 1, 1969

INVENTOR.
BERNARD L. SHARON
BY Charles M. Hogan
Eugene C. Goodale
ATTORNEYS.

United States Patent Office 3,573,949

Patented Apr. 6, 1971

3,573,949
PLATING STOPOFF PROCESS

Bernard L. Sharon, Williamsport, Pa., assignor to Avco Corporation, Williamsport, Pa.

Filed Apr. 1, 1969, Ser. No. 811,936
Int. Cl. C23b *5/00*
U.S. Cl. 117—5.5 8 Claims

ABSTRACT OF THE DISCLOSURE

This invention relates to an improved plating stopoff process for selectively masking areas in which plating is not desired and which results in a distinct separation of plated and non-plated surface areas.

BACKGROUND OF THE INVENTION

This invention relates to plating and more particularly to a method for selectively masking areas where plating is not desired with ease of subsequent masking removal.

In plating operations, it is often necessary and desirable to have specific areas of an article treated differently, i.e., in other words, having some areas of the article plated to prevent undesirable effects such as carburizing or nitriding and not plating other areas of the article. As an example, a copper plating can be used as a coating to prevent carburizing or nitriding. In the past, a wax or resist material has been used as a stopoff material to mask specified areas of the article in order to obtain the selective plating. In a typical prior art process using the wax stopoff, the entire article is subjected to a plating process in a copper plating solution, for example. The areas not requiring the surface hardening are then covered or painted with a wax material. The article is next placed in a chromic acid stripping solution which dissolves the copper from the non-waxed areas. The article is then rinsed to remove the acid and the wax is then removed with a solvent. These operations are time-consuming and costly. The chromic acid stripping solution is expensive and requires frequent replacement, which presents another problem for the manufacturer. In addition, this discarded stripping solution must be chemically treated, at a considerable expense, prior to disposal of the solution.

It is an object of the present invention to eliminate the waxing and wax stripping operations, as well as the associated problems in connection therewith.

Other objects of the present invention will be apparent to those skilled in the art in view of the steps and procedures hereinafter described.

SUMMARY OF THE INVENTION

This invention describes a method for treating an article having surface areas which are to be selectively treated, such as by plating. A fusible material is cast as a stop-off material over the areas where plating is not desired prior to the plating step. After plating, the fusible stopoff material is removed by the application of heat to the article at a temperature above the melting point of the stopoff material.

Other details, uses, and advantages of this invention will become apparent as the following description of an exemplary method thereof presented in the accompanying drawings proceeds.

BRIEF DESCRIPTION OF THE DRAWINGS

The accompanying drawings show a present exemplary embodiment of this invention in which.

DETAILED DESCRIPTION OF THE INVENTION

Figure 1:
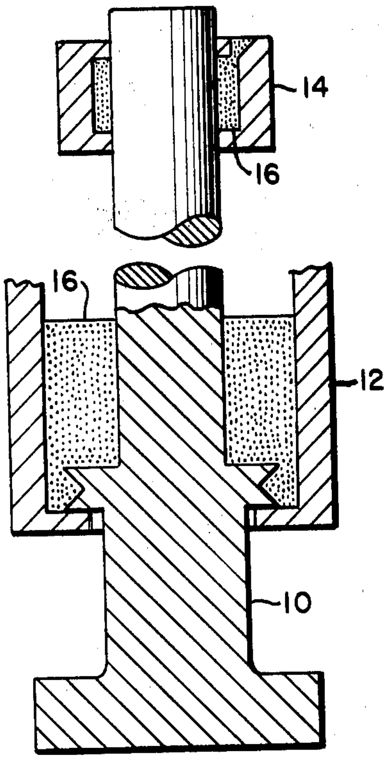
FIG. 1 is a cross-sectional view of an article to be treated according to this invention and showing the casting step.

In an illustrative embodiment, as seen in FIG. 1, there is shown generally as 10 an article such as a crankshaft, for example, on which it is desired to selectively plate specific surface areas of the article. In the performance of this invention, the article 10 is placed in a fixture or a mold, having a suitable way for filling, e.g., an open area or spout, such as that shown generally by 12 and 14. A stopoff material comprising a fusible low melting point alloy 16 is poured into the molds to mask the portion or areas of the article 10 where plating is not desired. The alloy 16 is allowed to solidify and harden after which the molds 12 and 14 are removed.

The article 10 with the alloy 16 cast thereon is then immersed in a plating tank so that the plating solution covers all non-alloy coated areas and at least a portion of the alloy mask. The plating solution will depend on the particular use required. In this instance, a cyanide copper plating bath is used to deposit copper so as to prevent either carburizing or nitriding of specific areas of the article.

When the plating step, such as electrolytic deposition, is completed, a thin sheet of plated copper 18 covers the article. As diagrammatically seen in FIG. 2, one masked off area of alloy 16 is completely encased by the copper sheet 18 and the other masked off area is not completely encased. The plating coverage depends on the immersion of the article 10 in the plating solution.

Figure 2:
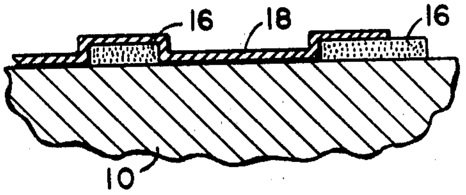
FIGS. 2–4 are diagrammatic views in section illustrating successive steps involved in the method of the present invention.
Figure 3:
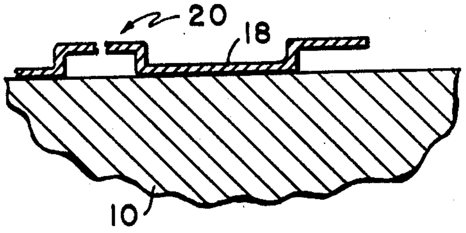

The use of the low melting point alloy 16 as the stopoff material facilitates easy removal of the stop-off material by heating the part 10 to a temperature above the melting point of the alloy 16. After the plating operation, the article 10 can be heated in an oil bath, oven, or similar device during which the melted alloy material 16 will drain or run off the areas which are not completely encased such as shown in FIG. 2. When the alloy 16 is encased by sheet 18, it is necessary to rupture the sheet 18 such as shown at 20 in FIG. 3. By rupturing the sheet 18, this allows the alloy 16 to free itself from the area it is protecting by running off as a liquid.

Figure 4:
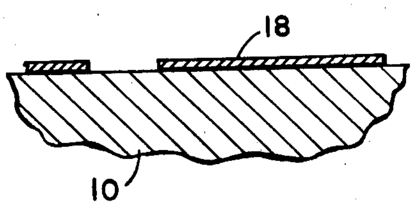

The resultant thin sheet of excess plated copper remaining after the stop-off material or alloy 16 has been removed may be easily peeled or stripped off the article 10 by any suitable stripping operation. The stripping operation leaves a remarkably clear and sharp demarcation line between plated and non-plated areas such as shown in FIG. 4. Peeling the excess material from the article will remove all plating from areas protected by the stopoff material but not from the areas where plating is desired because of the adhesion of the plate to the base metal. The low melting point alloy 16 can be recovered and used repeatedly. The excess plated material which is stripped from the article can also be accumulated and sold as scrap copper.

A general problem has existed with many stopoff materials because of seepage under the edges of stopoff material. In this invention it was found that a conductive alloy would minimize the tendency of the plating solution to seep under the stopoff material. In one example in which a 160° F. copper plating solution was used, a bismuth alloy having a melting temperature above 160° F. was used and test pieces processed in accordance with the present invention produced a sharp demarcation between the protected and non-protected areas of the base metal with no indications of seepage.

Although the present invention has been described with the illustrative embodiment usage being a cyanide copper plating solution for electrolytical deposition, this invention would be equally effective for other plating applications including electroless metal deposition processes. One example of an electrolyess metal deposition process is where it is desired to deposit a nickel plate uniformly on an object, such as a crankshaft, so as to bring the shaft up to proper size. The deposition is accomplished through the chemical interaction between the plating solution and the article to be plated. In addition, this process may be used for treating any article other than a crankshaft, which was merely used for illustrative purposes.

From the foregoing description it will be appreciated that the present invention provides a simple and effective method for the selective plating of articles.

While the steps of the present exemplary embodiment of this invention have been illustrated and described, it will be recognized that this invention may be otherwise embodied and practiced by those skilled in the art.

What is claimed is:

1. A process for plating specific areas of a metal article, which comprises:
casting a fusible metal alloy stopoff material to cover areas of the article where plating is not desired,
depositing a plating material on the article and on the stopoff material,
removing the stopoff material by heating the article to a temperature above the melting point of the stopoff material, and
stripping from the article the plated material which was deposited on the stopoff material.

2. A plating process as set forth in claim 1 in which the fusible material is a conductive low melting point alloy wherein the conductive alloy will minimize the tendency of the plating material to seep under the stopoff material, and in which the plating material is deposited by an electrolytic process.

3. A plating process as set forth in claim 1 in which the depositing of the plating material is performed by an electroless process.

4. A process for plating specific areas of a metal article, which comprises:
casting a low melting point metal alloy about an area of the article where plating is not desired,
immersing the alloy-clad article in a plating solution wherein the plating material is deposited on the article and alloy,
heating the plated article to a temperature above the melting point of the alloy wherein said alloy liquifies and drains from the article leaving a portion of the plating material not attached to the article, and removing the plating material not attached to be article and thereby leaving plated and non-plated areas on the article.

5. A process for plating specific areas of a metal article, which comprises:
casting a fusible low melting point metal alloy to areas of the article where plating is not desired,
plating the alloy clad article in a copper plating solution so that the article and at least a portion of the alloy is plated,
removing the cast alloy from the article by heating the alloy above its melting point, and
stripping the resultant sheet of plated copper left after the removal of the alloy to leave plated and non-plated areas on the article.

6. A process as set forth in claim 5 further comprising ing collecting said melted alloy for reuse.

7. A process as set forth in claim 5 in which a thin sheet of plated copper encases the fusible alloy, and further comprising rupturing a thin sheet of copper encasing the fusible alloy so that the melted alloy may be drained therefrom.

8. A process for plating specific areas of a metal crankshaft, which comprises:
casting a stopoff material of a conductive low melting point metal alloy about areas of the crankshaft where plating is not desired,
copper plating the crankshaft and at least a portion of the stopoff material by immersing the crankshaft into a copper plating solution until a desired plating thickness is depsited thereon,
removing the stopoff material by heating the crankshaft above the melting point temperature of the stopoff material, and
stripping the plated copper from areas protected by the stopoff material.

References Cited

UNITED STATES PATENTS

| | | | |
|---|---|---|---|
| 3,054,693 | 9/1962 | Whitehead | 117—38 |
| 3,309,227 | 3/1967 | McTeague | 117—5.5 |
| 3,523,067 | 8/1970 | Baird-Kerr et al. | 117—5.5 |

WILLIAM J. VAN BALEN, Primary Examiner

U.S. Cl. X.R.

117—8.5, 37, 51, 94